(No Model.)
H. B. ALLYN.
MACHINE FOR NOTCHING CLOTH.
No. 534,941. Patented Feb. 26, 1895.
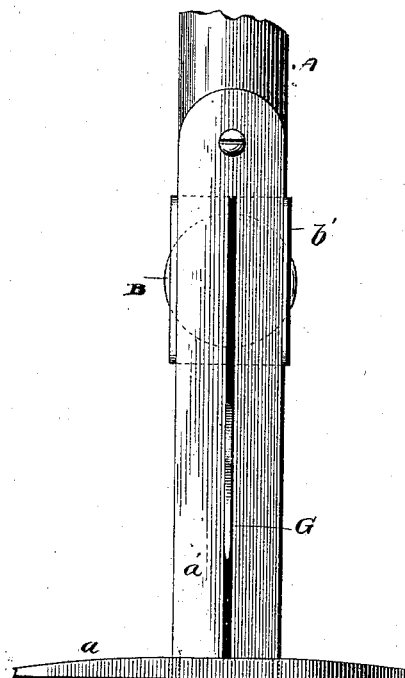
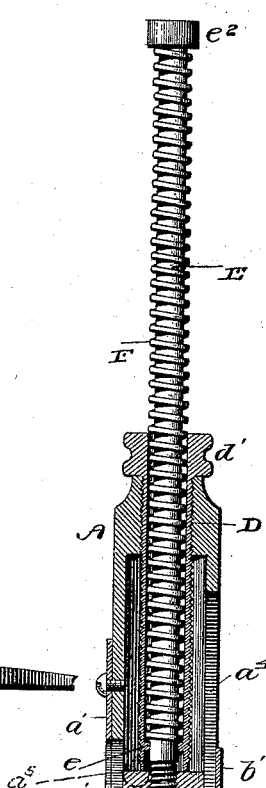
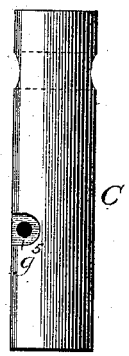
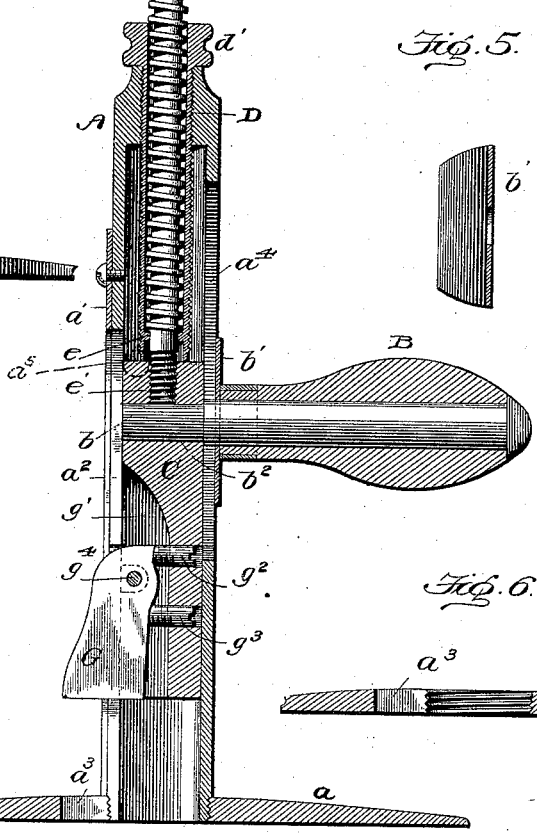

UNITED STATES PATENT OFFICE.

HARRY B. ALLYN, OF POUGHKEEPSIE, NEW YORK.

MACHINE FOR NOTCHING CLOTH.

SPECIFICATION forming part of Letters Patent No. 534,941, dated February 26, 1895.

Application filed December 15, 1894. Serial No. 531,866. (No model.)

*To all whom it may concern:*

Be it known that I, HARRY B. ALLYN, a citizen of the United States, residing at Poughkeepsie, in the county of Dutchess and State of New York, have invented certain new and useful Improvements in Machines for Notching Cloth; and I do hereby declare the following to be a full, clear, and exact description of the invention, such as will enable others skilled in the art to which it appertains to make and use the same.

My invention relates to that class of machines designed for use in the manufacture of ready-made clothing, in multiplying suits from a common pattern, and for similar uses wherein it is desirable to cut a large number of layers of cloth.

My invention has for its object to provide a machine of this class, which may be easily operated with one hand; which may be easily taken apart for repairing; and which may be quickly adjusted to cut thicker layers of cloth and to cut longer notches; furthermore, to provide a construction by which the energy of the retracting spring will always remain the same whether the cutter is operated from its highest or lowest point; and finally, to provide a machine which shall be simple and strong in construction and inexpensive of manufacture.

With these advantages in view, the invention consists in certain features of construction and combination of parts which will be hereinafter fully described and claimed.

In the accompanying drawings, Figure 1, is a vertical, sectional view of my improved notching machine. Fig. 2, is a front elevation of a portion of the hollow standard. Fig. 3, is a side elevation of the cutter head. Fig. 4, is a similar view of the cutter. Fig. 5, is a vertical section of the handle guard; and Fig. 6, is a similar view of the supporting base.

A, in the drawings, denotes the hollow standards which, in the present instance, is shown cylindrical in form and supported by a broad flat base $a$. In the front and rear walls of the hollow standard are formed respectively the cutter and handle shank slots $a^2$ $a^4$, the former of which is in line and communicates with a slot $a^3$ in the base.

Located in the hollow standard is a cutter head C, which has in its front wall, in line and communicating with the slot $a^2$, a cutter seat or recess $g'$.

Secured in this seat by a fulcrum pin or screw $g^4$ is the cutter G, the cutting edge of which projects outward through the slot $a^2$. The head of the screw or pin $g^4$ is made to come flush with the cutter head by cutting therein a recess $g^5$ so that the cutter head while closely fitting the interior wall of the hollow standard will have a free and easy movement therein. As it is oftentimes desirable to adjust the cutter in or out to cut shorter or longer slits or notches in the cloth, I have provided suitable means by which this adjustment may be secured without dismantling the machine. Screws $g^2$ $g^3$ are inserted in the cutter head at the rear of the cutter, the former above and the latter below its fulcrum pin or screw. If it is desired to make a longer slit or notch, the screw $g^2$ is worked rearward and the screw $g^3$ forward. This can be readily done by inserting a screw driver through the slot $a^4$ of the hollow standard, and when it is desired to remove the cutter for sharpening or any other purpose, it is only necessary to remove the screw or pin $g^4$ which may be readily done, when the head of the screw comes opposite a hole $a^5$ in the standard.

Screwed into the upper end of the hollow standard is an externally threaded sleeve D, having at its upper end a thumb piece $d'$, by which the sleeve may be worked up and down. Inserted through this sleeve is a rod E, the lower end of which is screwed into a screw thread socket $e'$ in the top of the cutter head, and the upper end of which is provided with a shoulder or head $e^2$. Coiled about this rod E, and confined between its head $e^2$ and a shoulder or flange $e$ in the lower end of the sleeve D, is a spring F, the energy of which is exerted to raise the cutter head and rod.

B denotes the handle, having a shank $b$, which is inserted in a transverse aperture $b^2$ in the cutter head. Secured to the handle shank is a shield $b'$, which partially covers the slot $a^4$, in the standard, and thereby prevents the hand of the operator from being cut or injured in the use of the machine.

Secured at the front of the hollow standard is a gage plate $a'$, against which the edges of the several layers or thicknesses of cloth are brought, thereby insuring a proper alignment of the edges and consequently a true cut.

In operation the several thicknesses of cloth to be notched are placed upon the supporting base $a$ with their edges abutting against the gage plate $a'$. The handle B is now depressed and the cutter G is forced through the several thicknesses, when by removing the pressure on the handle the spring F exerts its energy and releases the cutter head until its upper end is brought in contact with the lower end of the sleeve D. Should it be desired to cut a very large number of layers, the sleeve D is screwed upward in the standard, thus allowing the head to have a greater vertical movement.

It will be noticed that in increasing the range of movement of the cutter head, the tension of the spring is not effected owing to the fact that the spring is supported by the sleeve D, which, when adjusted does not change the relative relation of the two.

If it is desired to take the machine apart, the rod E is screwed out of the hole $e'$ in the cutter head, and the handle shank withdrawn from the transverse aperture $b^2$, and then by raising the standard the cutter head and cutter will fall out through the supporting base.

From the foregoing description taken in connection with the accompanying drawings, the operation and advantages of my machine will be apparent. It may be easily and rapidly operated with one hand, thus leaving the other hand free to keep the cloth in true alignment against the gage plate. It may readily be taken apart for repairs, or quickly adjusted to cut longer notches or a thicker pile of cloth without altering the energy of the retracting spring; and its simplicity of construction will enable it to be placed on the market at a cost such as to place the device within reach of all.

Having thus described my invention, what I claim, and desire to secure by Letters Patent, is—

1. In a notcher, the combination of a base plate, a slotted hollow standard rising therefrom, a vertically reciprocating cutter head located in said hollow standard and provided with a cutter which projects through said slot, a vertically adjustable sleeve secured in said standard above the cutter head, a rod located in said sleeve and secured to the cutter head, a spring carried by said rod and confined between the upper end of the rod and the lower end of the sleeve whereby the tension of the spring is not affected by the adjustment of the sleeve, and means for forcing the cutter to its work, substantially as set forth.

2. In a notcher, the combination of a base, a hollow slotted standard rising therefrom, a cutter head located in said standard, a cutter pivoted to said cutter head, and means located above and below the pivot of the cutter for adjusting the cutter in and out through the slot of the standard, and means for reciprocating the cutter head, substantially as set forth.

3. In a notcher, the combination of a base, a hollow slotted standard rising therefrom, a cutter head located in said standard, a cutter pivoted to said cutter head, screws located in the cutter head above and below the pivot of the cutter for adjusting the cutter in and out through the slot, and means for reciprocating the cutter head, substantially as set forth.

In testimony whereof I affix my signature in presence of two witnesses.

HARRY B. ALLYN.

Witnesses:
  IRVING ELTING,
  C. W. H. ARNOLD.